United States Patent [19]

Arseneau

[11] Patent Number: 5,210,423
[45] Date of Patent: May 11, 1993

[54] METHOD AND APPARATUS FOR UNPILING PULSES GENERATED BY PILED-UP SCINTILLATION EVENTS

[75] Inventor: Roger E. Arseneau, Buffalo Grove, Ill.

[73] Assignee: Siemens Gammasonics, Inc., Hoffman Estates, Ill.

[21] Appl. No.: 927,248

[22] Filed: Aug. 7, 1992

Related U.S. Application Data

[63] Continuation of Ser. No. 411,346, Sep. 22, 1989, abandoned.

[51] Int. Cl.$^5$ .................. G01T 1/208; G01T 1/161
[52] U.S. Cl. .................. 250/369; 250/362; 250/363.02; 364/413.24
[58] Field of Search .................. 250/362, 363.02, 369; 364/413.24

[56] References Cited

U.S. PATENT DOCUMENTS

| | | |
|---|---|---|
| 4,051,373 | 9/1977 | Hatch .................. 250/363.02 |
| 4,323,977 | 4/1982 | Arseneau .................. 250/363.02 |
| 4,535,242 | 8/1985 | Dirkse et al. .................. 250/363 |
| 4,593,198 | 6/1986 | Pang et al. .................. 250/366 |
| 4,612,443 | 9/1986 | Alcidi .................. 250/362 |
| 4,629,894 | 12/1986 | Lelong .................. 250/363.02 |
| 4,881,171 | 11/1989 | Jatteau et al. .................. 364/413.24 |

FOREIGN PATENT DOCUMENTS

0166169 5/1985 European Pat. Off. .

Primary Examiner—Constantine Hannaher
Attorney, Agent, or Firm—Mark H. Jay

[57] ABSTRACT

A signal containing piled-up pulses from a scintillation camera head is sampled at a high frequency. Samples are summed to provide a time-integration of pulses which are sampled. When pulses pile up, the tail of the first pulse can be determined by extrapolation, permitting the first pulse to be energy-validated. The overlapping tail of the first pulse and the head of the second pulse are also time-integrated, and the area of the tail of the first pulse is subtracted from the time-integration so obtained. It is then possible to validate the second pulse.

11 Claims, 12 Drawing Sheets

METHOD AND APPARATUS FOR UNPILING PULSES GENERATED BY PILED-UP SCINTILLATION EVENTS

CROSS-REFERENCE TO RELATED APPLICATION

This is a continuation of application No. 07/411,346 filed Sep. 22, 1989, now abandoned.

BACKGROUND OF THE INVENTION

The invention relates to scintillation cameras, and more particularly relates to signal processing techniques which may be used in such cameras. In its most immediate sense, the invention relates to signal processing technology which is used to unpile so-called "pile-up" events.

A scintillation camera converts scintillation events in a scintillation crystal into electrical signals, which are later processed to produce a planar or tomographic image of a region of interest in a patient's body. Such signals are not equally useful; some contain a favorable ratio of information to statistical noise, while others contain an unfavorable ratio. An accurate image cannot be based on erroneous information, and it is therefore necessary to test the signals for the likelihood that they contain useful information, rejecting ("dumping") those with lesser information content and accepting and using those with more information content.

One such test (herein referred to as "energy-validation") is for energy content. In a conventional scintillation camera, for example, the electrical pulse from a scintillation event is integrated to derive a measure of the incident energy of the photon which generated the event. Then, this derived measure is compared with a range, or "window", of acceptable energies. If the derived energy of the event falls within the window, the event is considered to contain useful information, and the pulse is considered "valid" and used in subsequent camera systems. If the derived energy of the event falls outside the window, the event is considered to contain large quantities of noise (it may, e.g., be a "scattered" event which is deflected in the body), and the "invalid" pulse is dumped.

However, there are circumstances in which such a test cannot produce meaningful results. One such circumstance, commonly referred to as a "pulse pile-up" or "pile-up", takes place when two scintillation events follow each other so quickly that they overlap. When such an overlap occurs, the two resulting electrical pulses become superposed. In this situation, the integrated superposed pulse and its coincidence with the energy window have no meaning, because, in the general case, there is no a priori way to determine, from the integrated superposed pulse, whether the superposed pulse results from two valid pulses, two invalid pulses, or one invalid pulse and one valid one. This in turn comes about because the degree of overlap between the two piled-up events is not known in advance.

This problem has long been recognized, and has been dealt with in various ways. One approach is to identify the existence of a pulse pile-up and to dump all pulses which contribute to it. While this approach prevents invalid events from being further utilized, it discards data which may well represent valid events. This effectively reduces the rate at which meaningful data are acquired and consequently makes it necessary to prolong a patient study. This decreases patient throughput through the camera and increases costs, and is consequently undesirable.

Another approach is to use the occasion of a pulse pile-up to simulate the tail of a preceding pulse. This simulated tail can be used as a correction to the preceding pulse and can be used in subsequent processing in the stead of the actual pulse tail which it simulates. This approach suffers from the disadvantages that the simulation is not necessarily accurate over a wide range of pile-up conditions and that it is undesirable to process simulated data instead of actual data.

One object of the invention is to permit a pulse pile-up to be unpiled with a high degree of accuracy under a relatively wide range of pile-up conditions.

Another object of the invention is to reduce, as much as possible, the need to discard piled-up pulses which have been generated by valid scintillation events.

A further object of the invention is to use actual data, rather than simulated data, in the construction of planar and tomographic images, even in the event of pulse pile-ups.

The invention proceeds from a realization that the use of conventional pile-up detection circuitry makes it difficult to unpile pulse pile-ups. This is because conventional circuitry is of the analog type. As a result, the shapes of pulses and pulse pile-ups are not preserved in the camera head electronics. An accurate determination of the existence of a pulse pile-up and an accurate unpiling of the pile-up requires accurate analysis of wave shapes. Consequently, such analysis is more difficult when analog circuitry is used to carry the analysis out.

In accordance with the invention, pulses generated by scintillation events are sampled at a high frequency. This preserves the shape of the pulses. In further accordance with the invention, the samples are summed together, thereby effectively integrating the pulse, but on a progressive basis and not over a fixed predetermined time constant, and the resulting integral is stored. If the next pulse is piled-up upon a previous pulse, the next pulse can usually be unpiled and energy-validated using the stored information about the previous pulse. Should the next pulse, after energy-validation, be found valid, the stored information from the first pulse is replaced by information from the next (and now validated) pulse. If the next pulse cannot be unpiled, or if the next pulse is not piled-up on its predecessor, the stored information is purged.

In further accordance with the invention, there is provided an algorithm which is particularly suitable to pipeline-type operation, such as exists in a scintillation camera head. When pile-ups take place, it is normally possible to unpile the first of the piled-up pulses and to store information about it while the second piled-up pulse is being unpiled (with the aid of the stored information). After this has taken place, the originally-stored information is purged and replaced by information about the second piled-up pulse, for use if necessary in unpiling a third piled-up pulse, and so forth. Only where two pulses are so closely simultaneous that they cannot be unpiled are those pulses (and any subsequent pulses which may be piled-up upon them) dumped.

In yet further accordance with the invention, a pulse under investigation is energy-validated before it has died out. This is accomplished by extrapolating the remaining portion of the pulse and determining whether the time integral of the pulse—including the extrapolated portion—falls within the desired energy window.

Where the extrapolation takes place at the beginning of a pile-up of a second pulse upon a first pulse, the time integral of the extrapolated portion of the first pulse can be computed even before the first pulse has died out. The resultant time integral can then be subtracted from the time integral which commences with the beginning of the second pulse and ends at the end of the second pulse (or with the beginning of a third piled-up pulse, if this occurs). The difference can then be compared with the energy window to energy-validate the second pulse.

With the exception of energy-validation, the above-described aspects of the invention are equally applicable to the channels of a scintillation camera which process the X and Y coordinate data, and are not restricted to the Z (energy) channel. The invention is not restricted to use in the Z channel of a scintillation camera.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

Although the invention is shown as embodied in a conventional Anger-type gamma camera, the invention is applicable to all scintillation cameras (including, e.g., PET scanners) and the invention is not limited to gamma cameras.

In a conventional gamma camera nuclear medicine study (see FIG. 1), a radioactive isotope (not shown) is administered to a patient 2. Gamma radiation exiting the patient 2 is collimated in a collimator 4 and the thus-collimated radiation is directed to a scintillation crystal 6 of, e.g. NaI(Tl). (Other scintillators may be used; NaI(Tl) is not a part of the invention.)

Figure 1:
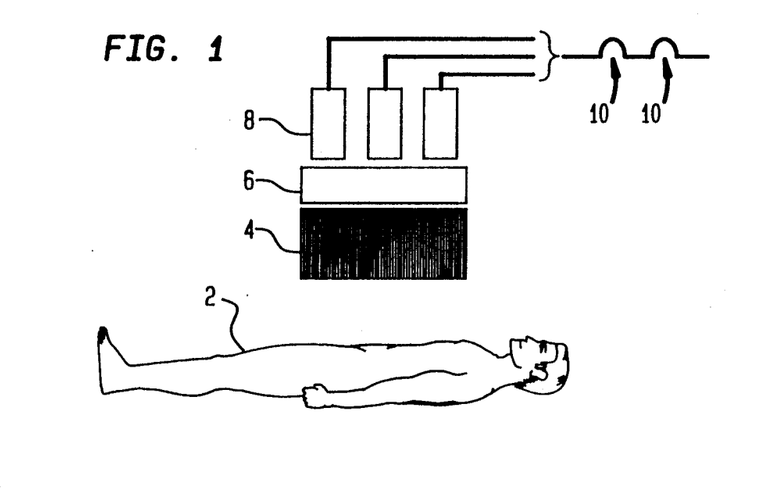
FIG. 1 is a highly schematized diagram of a scintillation camera head in use.

The interaction of gamma radiation with the scintillation crystal 6 produces scintillation flashes (also known as scintillation events, and not shown) in the crystal 6. A plurality of photomultiplier tubes 8 are placed in optically coupled relation to the scintillation crystal so as to view scintillation events which take place in the crystal 6. The photomultiplier tubes 8 convert the scintillation events to electrical pulses shown schematically as 10, from which the locations and energies of the events can be derived. When the locations and energies of a large number of such events have been accumulated, the distribution of events will reflect the organs in which the radioisotope has accumulated and a two or three dimensional image of those organs can be constructed. In FIG. 1, the region of interest includes the heart of the patient 2, but this is not a part of the invention.

It has long been known that not all scintillation events in the scintillation crystal 6 are generated by radiation from the patient 2. Cosmic rays, for example, can generate such events, as can stray radiation from non-patient sources. Thus, some scintillation events in the scintillation crystal 6 do not reflect the condition of the patient, and to the extent that those events are considered in the construction of an image, the image will be erroneous.

To prevent such events from being counted and used in later imaging, the pulses 10 are tested so as to effectively measure the energy of the scintillation events which generated them. Thus, where $I^{131}$ is used, the pulses are tested to see if their corresponding scintillation events have energies corresponding to $I^{131}$ gamma radiation. If so, the events are considered to be generated by patient-originated radiation and are counted; if not, the events are considered to have been generated by extraneous radiation, and are dumped. This testing process involves computing the energy which is represented by the pulse and is herein referred to as "energy-validation"; a pulse which represents an energy which approximately corresponds to the appropriate isotope energy is a "valid" pulse and a pulse which represents an energy which does not so correspond is an "invalid" pulse.

Figure 2A:
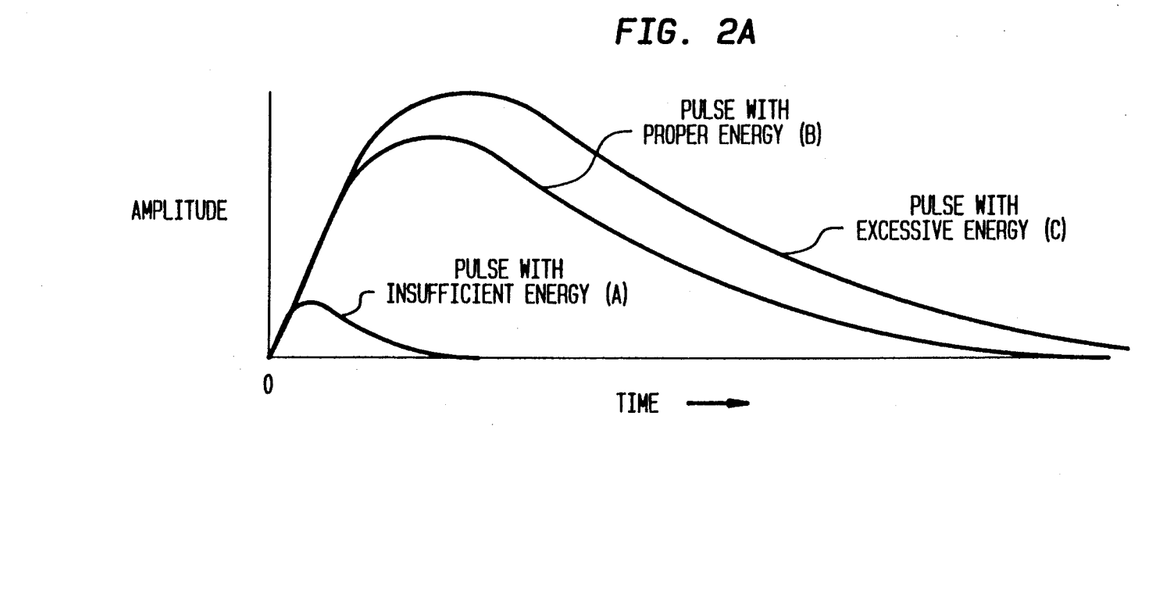
FIGS. 2A and 2B illustrates conventional energy-validation of a pulse which is produced by a scintillation event.
Figure 2B:
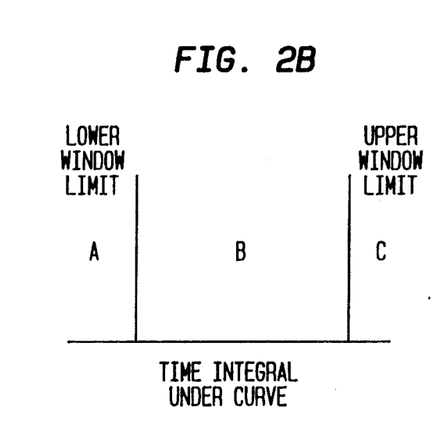

Energy-validation is conventionally carried out by integrating, with respect to time, the pulse which is to be energy-validated. This is because the area under the curve of the pulse (where pulse amplitude is on the abscissa and time is on the ordinate) represents the energy of the event. Thus, as is shown in FIGS. 2A and 2B, where the time-integrated pulse does not fall within a predetermined energy window, the pulse/event is invalid and is dumped; where the integrated pulse does fall within the window, the pulse/event is valid, and is used.

Figure 3A:
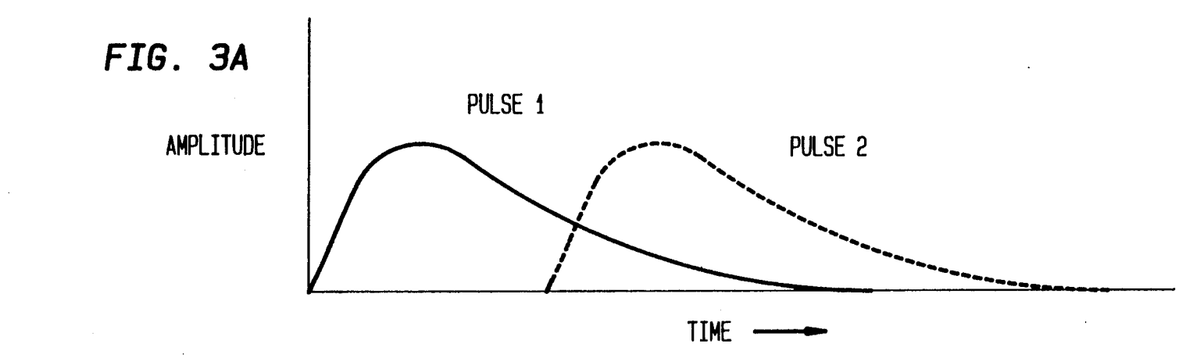
FIGS. 3A and 3B illustrates why conventional energy-validation cannot usually be carried out on piled-up pulses.
Figure 3B:
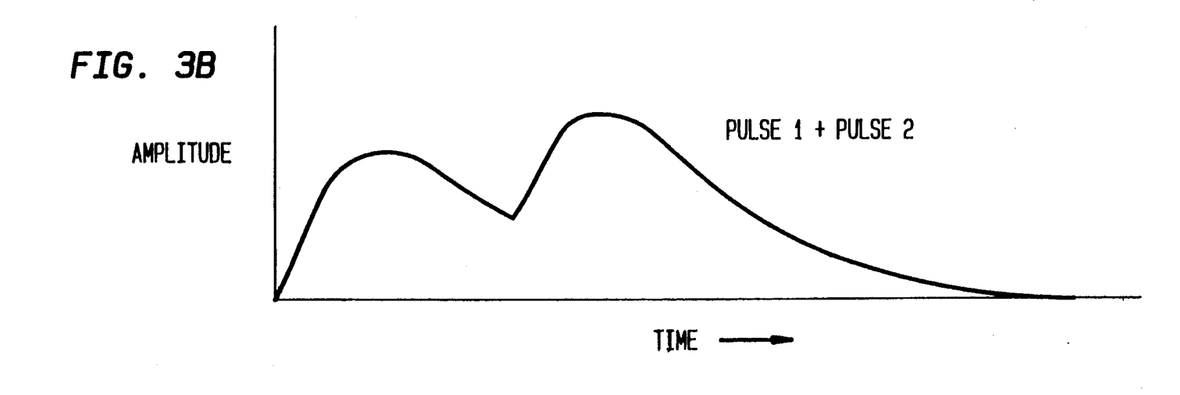

In certain circumstances, this energy-validation process does not produce meaningful results. For example, let it be assumed that two events of insufficient energy pile up upon each other, i.e. are so close in time that they overlap. As can be seen in FIGS. 3A and 3B, the resulting pulses likewise overlap and, by superposition, produce a composite pulse.

If the composite pulse is time-integrated, the integral may well fall within the predetermined energy window. Thus, energy-validation would produce a valid outcome, even though both events are of insufficient energy and should be dumped. Contrariwise, if an invalid event piles up upon a valid event, the integral may well be outside the window; energy-validation would then produce a single invalid outcome where one pulse should be found valid and only the other pulse should be dumped.

In gamma cameras as presently manufactured by Siemens Gammasonics, Inc., circuitry is provided to detect whether a pile-up has taken place. Where a pile-up has been detected, both pulses are dumped. This causes otherwise useful data to be discarded and decreases the effective count rate of the camera, consequently decreasing patient throughput through it and increasing costs. Fundamentally, the engineering decision to dump both pulses comes about because the camera does not "know" whether a pulse is valid before the end of the pulse is reached; only when the integration process has been completed is the energy represented by the pulse known. In effect, the shape of the pulse—i.e. the amplitude of the pulse as a function of time—is ignored in favor of the time-integral of the pulse as a whole.

Figure 4:
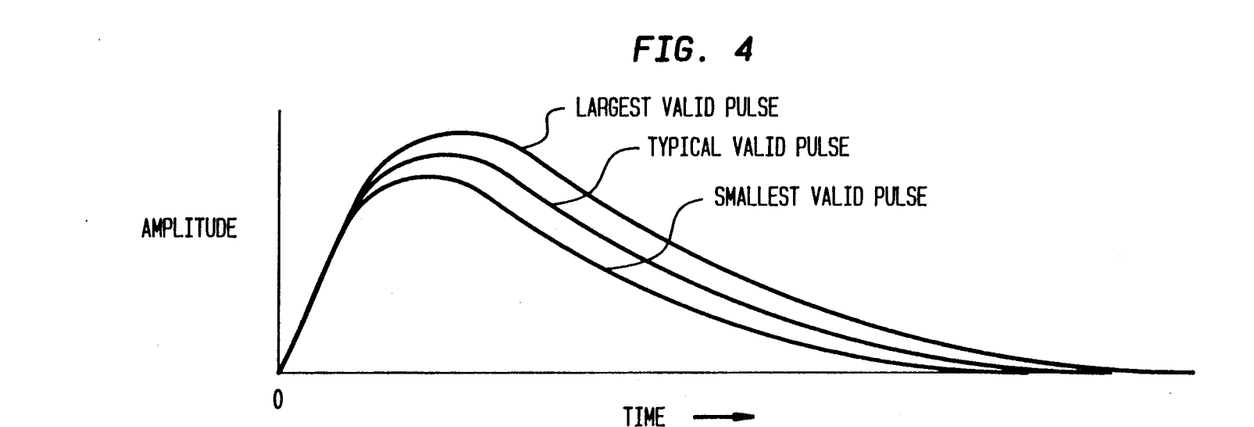
FIG. 4 schematically illustrates a range of valid pulses.
Figure 5:
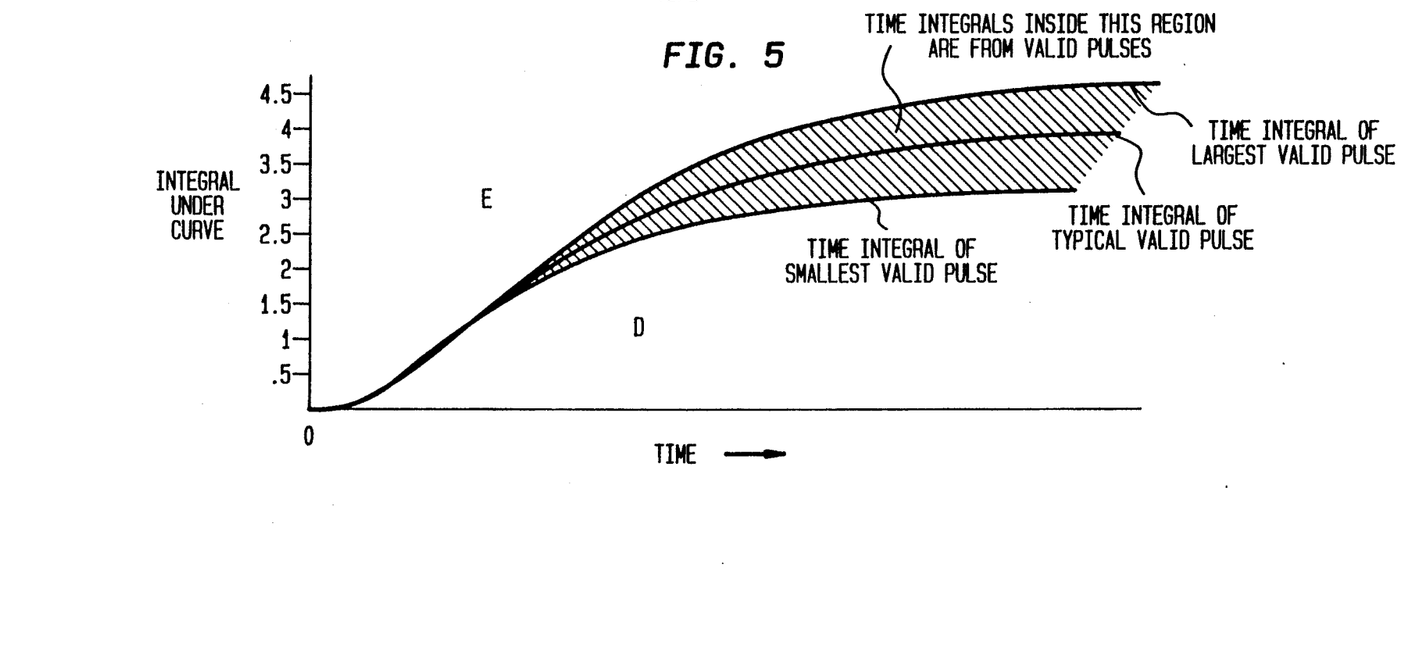
FIG. 5 schematically illustrates the time integrals of the pulses of FIG. 4 and the concept of progressive integration of pulses as an energy-validation process.

However, let it be assumed that the pulse (see FIG. 4) is sampled at a high frequency. It is known that a pulse from a scintillation event has a characteristic shape, as shown. If the area as determined by successive samples is summed as shown in FIG. 5—i.e. if the pulse is effectively time-integrated on a continuous basis starting from the beginning of the pulse—and the sum closely matches the area which would be expected to exist under the same part of the curve of a valid pulse, there will come a time (and the time will be substantially ahead of the end of the pulse) when it can be reliably assumed that the pulse is valid even though it has not actually ended. Similarly, if the sum of the samples differs substantially from the area under the same part of the curve of a valid pulse, the sampled pulse may be treated as invalid. These situations are illustrated in FIG. 5, wherein integrals in the shaded region are typical of valid events, integrals in region D are characteristic of events having energies which are deficient (below the lower window limit) and integrals in region E are characteristic of events having energies which are excessive (above the upper window limit).

Figure 6:
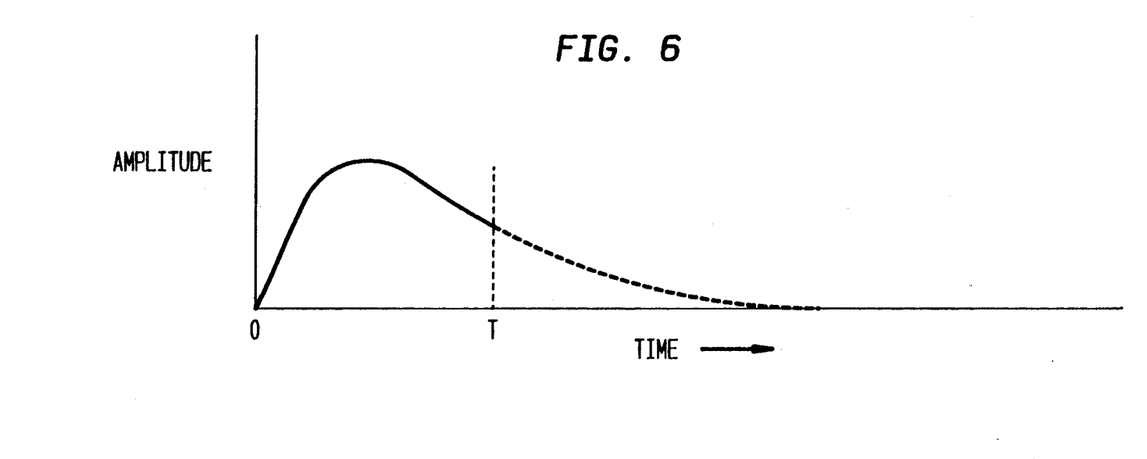
FIG. 6 schematically illustrates the concept of extrapolating the end of a pulse which has not died out at the time of extrapolation.

A further consequence of the known shape of the pulse from a scintillation event is that the tail of the event can be extrapolated at some time well prior to the end of the pulse. Thus, for the pulse depicted in FIG. 6, it is known at time T that the pulse will look as shown in dotted lines and the area under the tail of the pulse will likewise be known.

From this, it may be understood that a pulse may be energy-validated before it has ended and that the future shape of the pulse may be predicted at the time of energy-validation. The accuracy of the energy-validation and shape prediction depends upon the time at which these processes take place, relative to the beginning of the pulse. The longer the time interval between the beginning of the pulse and the point of energy-validation/prediction, the more accurate the energy-validation/prediction will be.

Figure 7:
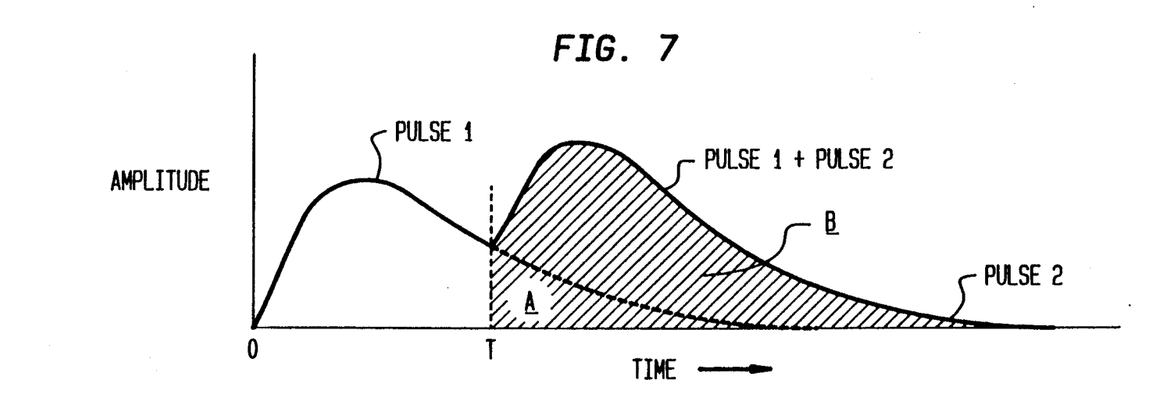
FIG. 7 shows how the extrapolation process illustrated by FIG. 6 can be used to unpile two piled-up scintillation events.

The consequences of sampling in unpiling pile-ups can now be understood in connection with FIG. 7 (which is a copy of FIG. 3B). Let it be assumed that pulse 2 piles up, as shown, on pulse 1. When pulse 2 begins at time T, the composite pulse formed from the sum of pulses 1 and 2 increases in amplitude. If enough data exists at time T to predict the future shape of pulse 1 (i.e. if time T is sufficiently late with respect to the beginning of pulse 1), the area A of the tail of pulse 1 can be determined by extrapolation from the data existing at time T and the total area under pulse 1 alone can consequently be accurately estimated. As a result, pulse 1 can be energy-validated at time T even though it has not ended at time T, and in the instance illustrated pulse 1 can be counted as a valid event.

Sampling will then continue until the end of pulse 2. A separate determination of the area B is then available. It is therefore possible to determine the energy of pulse 2 by subtracting A (the energy in the tail of pulse 1) from B (the energy in the tail of pulse 1 plus the energy of pulse 2). This difference can then be energy-validated and pulse 2 shown valid or invalid, as the case may be.

Thus, it is possible to energy-validate both pulses involved in a pile-up if the pulses are spaced far enough apart in time. It is unnecessary to discard all involved pulses merely because a pile-up occurs, and it is possible to individually energy-validate both pulses, regardless of whether the first pulse is valid or invalid.

Figure 8A:
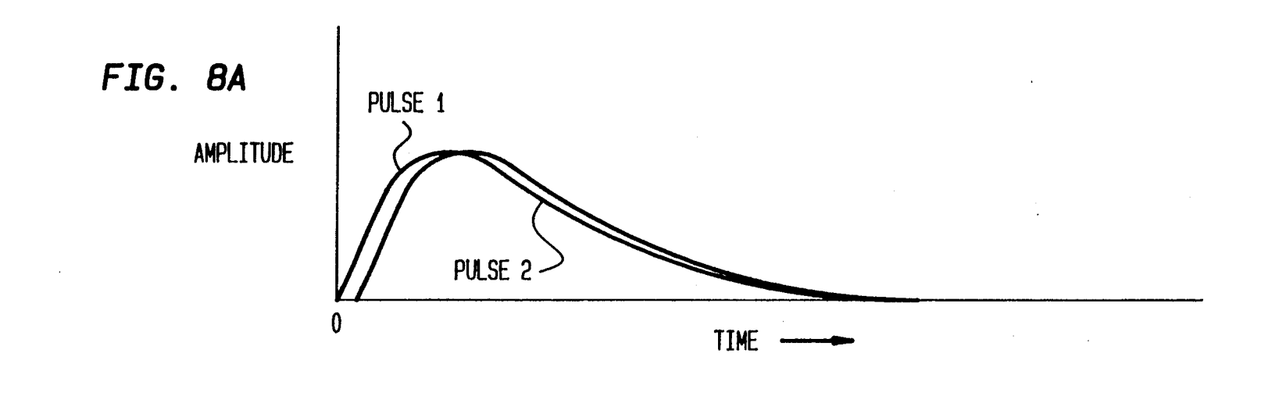
FIGS. 8A and 8B shows two pulses which are so piled-up that they cannot be unpiled.
Figure 8B:
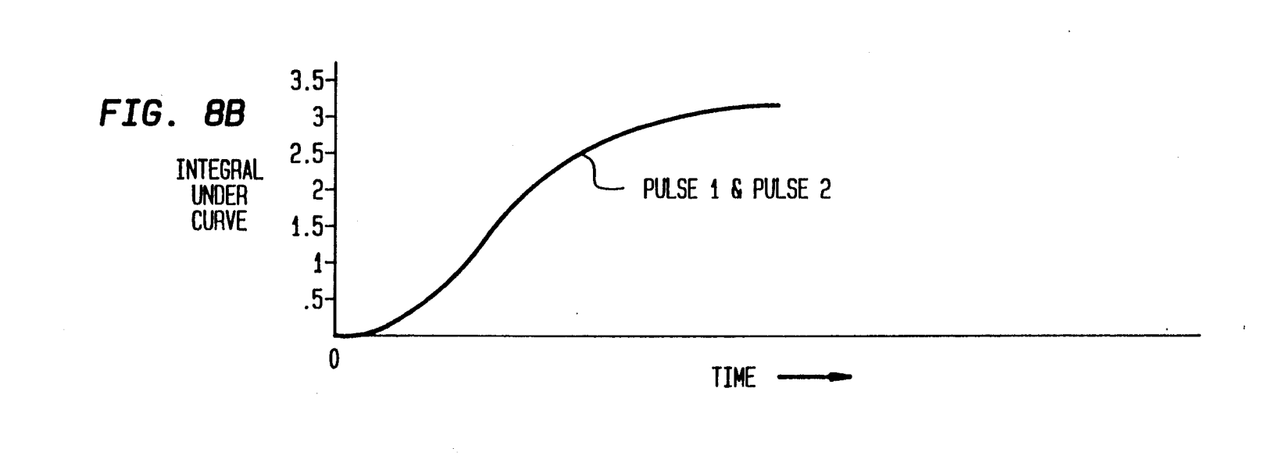

It will be understood, however, that if a pile-up is severe enough, i.e. if the two pulses begin almost simultaneously, it will be impossible to unpile them accurately. For example, let it be assumed that the pile-up is as illustrated in FIGS. 8A and 8B wherein pulse 2 begins almost immediately after pulse 1. In this case, sampling pulse 1 and totalling the samples does not provide enough data to establish that pulse 1 is indeed a pulse resulting from a scintillation event, because pulse 2 begins so soon that the integral of the superposition of pulses 1 and 2 goes immediately out of bounds. Sampling of a particular pulse must proceed long enough in the absence of another pulse so that an extrapolation of the remaining portion of the pulse in question has a sufficiently high likelihood of being accurate. Where the two pulses are spaced too closely together in time, the resulting pile-up is considered unresolvable and both events must be dumped.

Figure 9A:
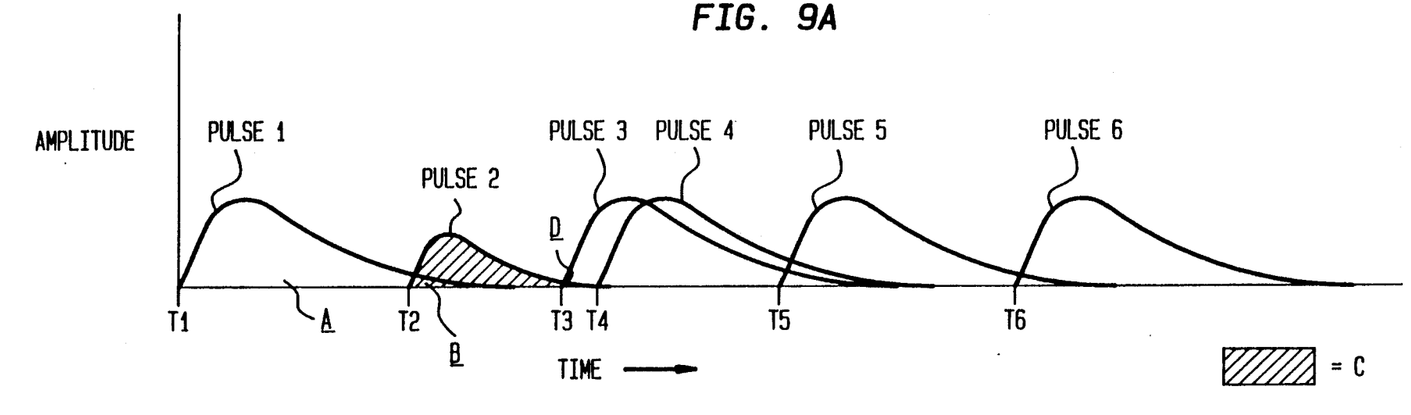
FIGS. 9A and 9B shows how a series of six piled-up pulses would be treated in accordance with the invention.
Figure 9B:
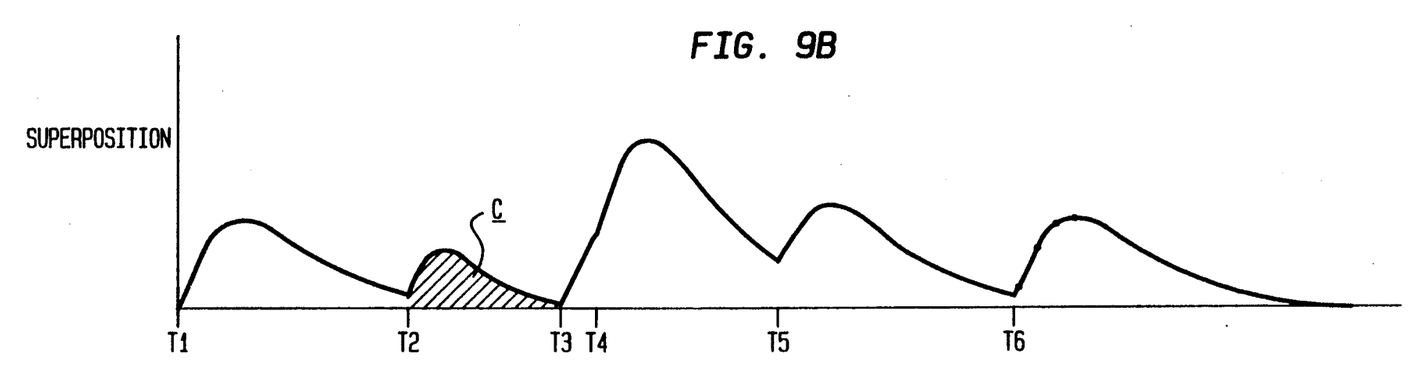

This unpiling algorithm is generally applicable to all pile-ups, regardless of the number of pulses involved. This may be demonstrated in the case of an electrical signal representing a 6 pulse pile-up, as is illustrated in FIGS. 9A and 9B.

In this example, pulse 1 begins at time T1. Pulse 1 is sampled and the samples are summed until pulse 2 begins at time T2. At time T2, the amplitude of the electrical signal begins to rise, indicating that a second pulse has been encountered. From the sample total (area in region A) and the time interval (T2−T1), it is possible to extrapolate the area B of the tail of pulse 1. Thus, at time T2, the total energy of the scintillation event which generated pulse 1 can be determined by adding A and B. Pulse 1 is energy-validated and determined to be valid.

While area B is stored, sampling and totalling of the electrical signal continues until time T3, when pulse 3 begins. The area C represents the energy released by pulse 2 between times T2 and T3 plus the energy of the tail of pulse 1. Thus, to energy-validate pulse 2, it is necessary to subtract B from C and to see if the difference, for a pulse duration of (T3−T2), represents a valid pulse or not. In this example, pulse 2 is invalid.

It is also possible, at time T3, to extrapolate the tail of pulse 2, i.e. to determine area D. Area D is stored while sampling of pulse 3 commences. Time-integration of pulse 3 begins and continues until time T4 (when pulse 4 begins). In this example, time T4 is very close to time T3; so close that pulses 3 and 4 cannot be unpiled. It is therefore impossible to determine anything about pulses 3 and 4 and both are dumped. Area D is of no further use and is removed from storage. Integration of the signal train ceases until it can be determined that a pulse has completely or substantially ended. (This is done by continuing the sampling process and examining the resulting samples for amplitudes which are equal to, or less than, a predetermined threshold value.) In the case of pulse 5, which starts at time T5, pulse 4 has clearly not ended by the time pulse 5 starts, so pulse 5 is dumped as well because there is no way to determine the energy represented pulse 5 when the energy represented by the tail of pulse 4 is unknown. However, pulse 5 has reached an appropriately low amplitude at time T6, when pulse 6 commences. Thus, integration of pulse 6 can start from the beginning, as in the case of pulse 1.

Figure 10:
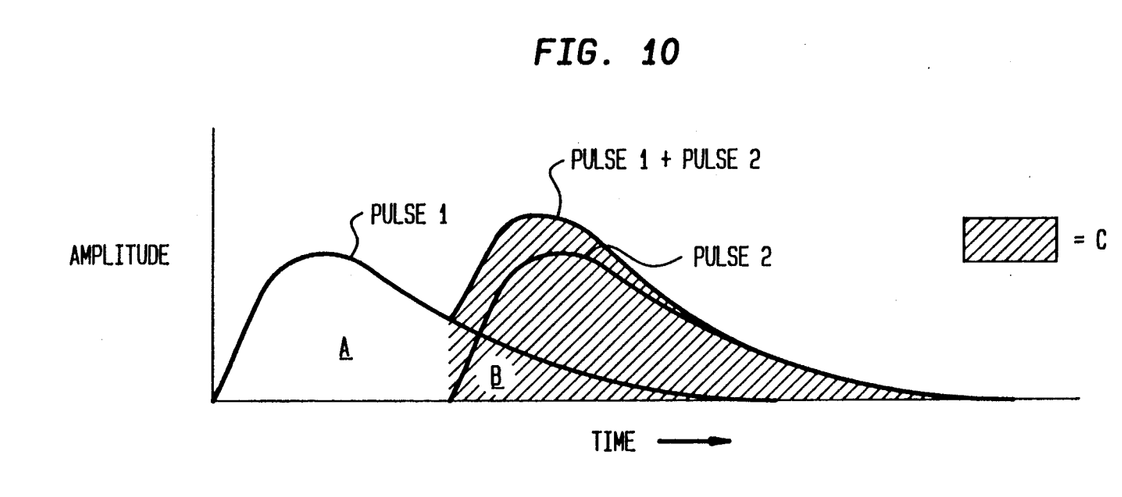
FIG. 10 illustrates how extrapolation takes place using the two ROMs in the preferred embodiment.

In the preferred embodiment, most of the steps are carried out by software. However, this is not so for the extrapolation steps, because the time required for extrapolation would be excessive. The extrapolation steps are advantageously carried out by using ROMs. In the preferred embodiment, there are two such ROMs. The contents of the ROMs are illustrated by FIG. 10, which will now be discussed.

ROM1 is used when the pulse currently under investigation is not piled-up upon a prior pulse. The duration of the current pulse is input to ROM1. ROM1 then outputs a multiplication factor. This factor is chosen so that when the sum of the samples (area A) is multiplied by the factor, the result is the total time-integral of pulse 1 (area A plus area B). This total energy is then tested to energy-validate pulse 1.

Figure 11:
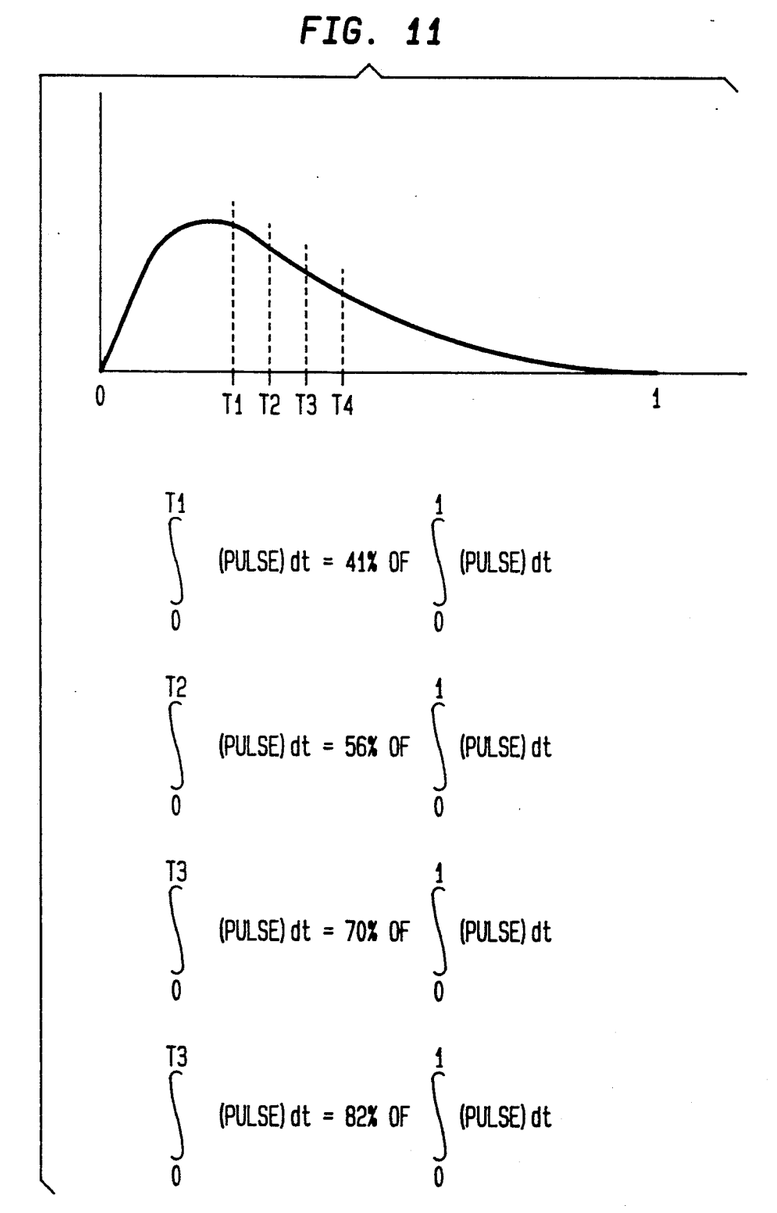
FIG. 11 illustrates how the contents of the ROMs may be determined.

A person skilled in the art can determine the contents of ROM1 by constructing a lookup table in accordance with the ratios which are illustrated in FIG. 11. Since the shape of a pulse may be treated as if it were fixed, it is known that, for example, the time-integral of a pulse from its beginning to time T1 will be perhaps 41% of the total time-integral of the pulse. At time T2, this ratio will increase to perhaps 56%, at time T3, this ratio will increase to perhaps 70%, and at time T4, to perhaps 82%. Consequently, for an input of T1, the lookup table would return the output 2.4 (100% divided by 41%), for an input of T2, the lookup table would return 1.8 (100% divided by 56%), for an input of T3, the lookup table would return 1.4 (100% divided by 70%) and for an input of T4, the lookup table would return 1.2 (100%. divided by 80%). FIG. 11 is not to scale and these ratios are exemplary and not part of the invention.

ROM2, on the other hand, is used when the pulse currently under investigation is piled-up upon a previous pulse. The duration of the prior pulse is input to ROM2. ROM2 then outputs a division factor. The factor is chosen so that when the sum of the samples of the prior pulse (area A) is multiplied by the factor, the result is the area under the tail of pulse 1 (area B alone). When area C has been determined, it is possible to subtract area B from area C to arrive at the area under the head of pulse 2. This, when multiplied by the appropriate multiplication factor stored in ROM1, permits pulse 2 to be energy-validated.

The contents of ROM2 can also be determined by a person skilled in the art in a manner similar to that described for ROM1. For example, at time T1, the area of the head of the pulse will be 41% of the total area of the pulse, so that the area of the tail of the pulse will be 59%. Thus, for time T1, the lookup table in ROM2 would return 1.4 (59% divided by 41%). At times T2, T3 and T4, the lookup table would return, respectively, 0.78 (44% divided by 56%), 0.43 (30% divided by 70%) and 0.22 (18% divided by 82%).

It would theoretically be possible to use a single ROM instead of two ROMs, because the two ROMs output consistent information in different forms using similar inputs. In the preferred embodiment, however, two ROMs are used because this facilitates a pipeline-type processing algorithm. It should be understood that pulse 2 in FIG. 11 may not have actually died out before another pulse commences. By using ROM1 to energy-validate pulse heads of known time-integral and duration, and by using ROM2 to derive pulse tails of assumed time-integral, it becomes convenient to pipeline the energy-validation process by shifting information into ROM1 as described above.

The above description has proceeded on the basis that the duration of a pulse under investigation and of a prior pulse will be known with sufficient precision. While this is true, the preferred embodiment accomplishes this using a particularly advantageous technique which will now be described in connection with FIG. 12.

Figure 12:
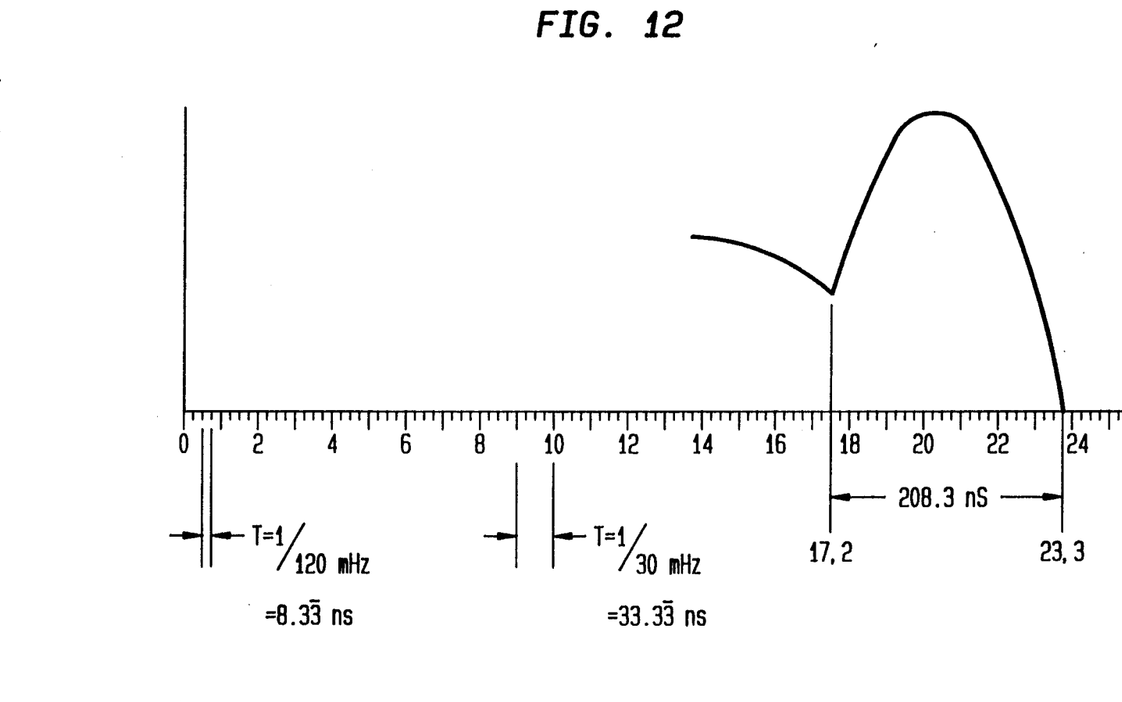
FIG. 12 illustrates how time and duration information is measured in accordance with the preferred embodiment.

It is known to persons skilled in the art that computational efficiency is enhanced by digitizing the samples of the pulse-containing signal. This is accomplished by so-called "flash" A/D converters, these converters being so named because they operate very quickly and permit sampling to take place at a high rate. Even though these A/D converters are very fast, they are not fast enough to permit accurate extrapolations to take place. Consequently, it is necessary to know the duration of a pulse with greater precision than is afforded by currently practicable sampling rates (in the preferred embodiment, sampling occurs at 30 MHz).

To accomplish this, the on-board process-controlling clock runs at 120 MHz, and the clock pulses are routed through a divide-by-4 frequency divider before they are used to clock the sampling and flash A/D conversion of the pulse-containing signal. Beginnings and ends of pulses are determined in a timing sense by monitoring the sample number and the state of the frequency divider (which will be 0, 1, 2 or 3). Thus, if a first event takes place at sample 17 and clock position 2 and a second event takes place at sample 23 and clock position 3, the interval between the two events will be $(23-17)*1/(30 \text{ MHz})+(3-2)*1/(120 \text{ MHz})=208.3\text{ns}$ It will be understood, however, that this preferred method of timing events is not essential to the invention and can be eliminated when and if sufficiently fast flash A/D converters become available at price levels which permit them to be used in conventional gamma cameras.

Figures 13, 13A:
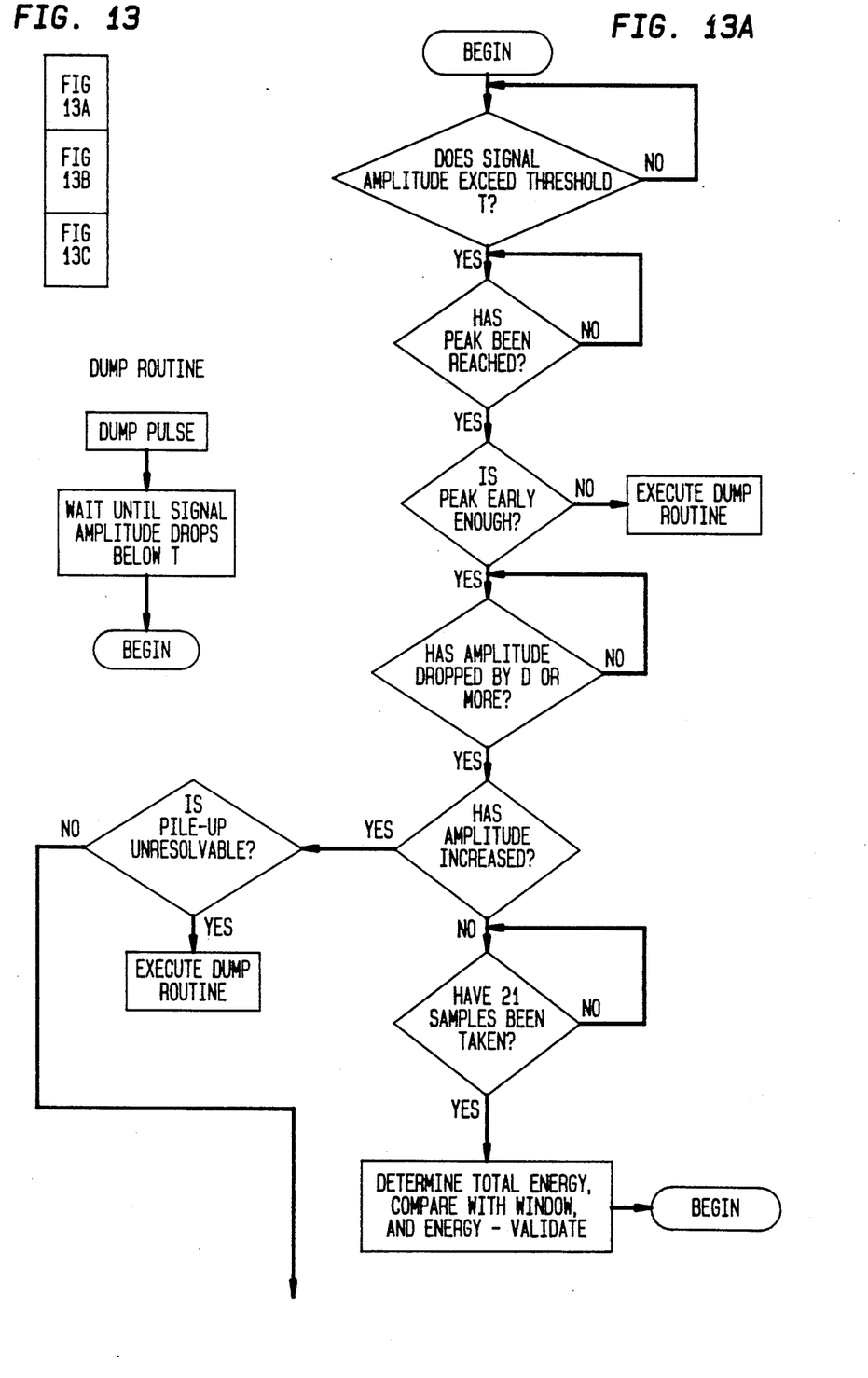
FIG. 13 (FIGS. 13A–C) is a flow chart of the preferred embodiment of the invention.
Figure 13B:
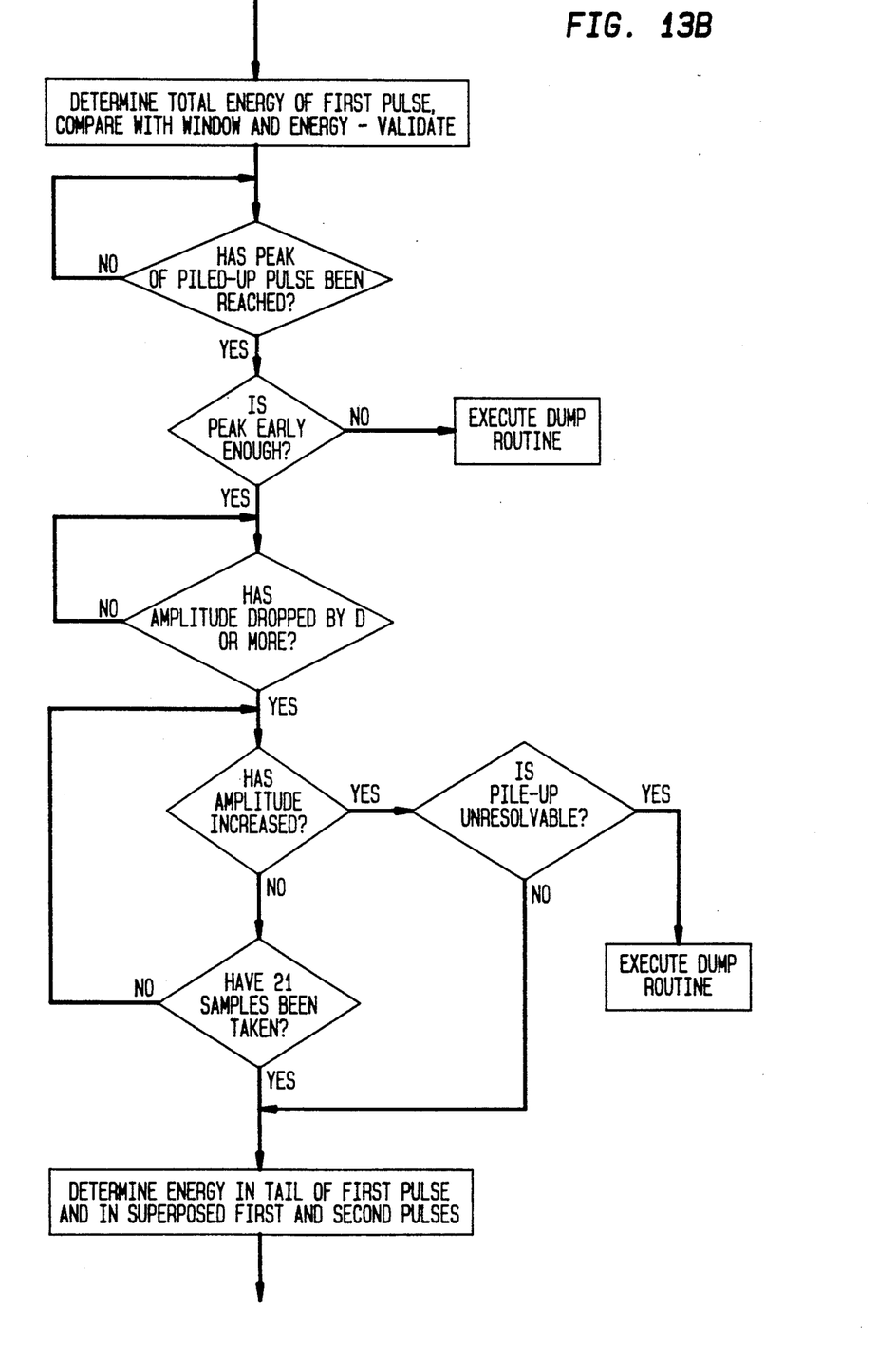
Figure 13C:
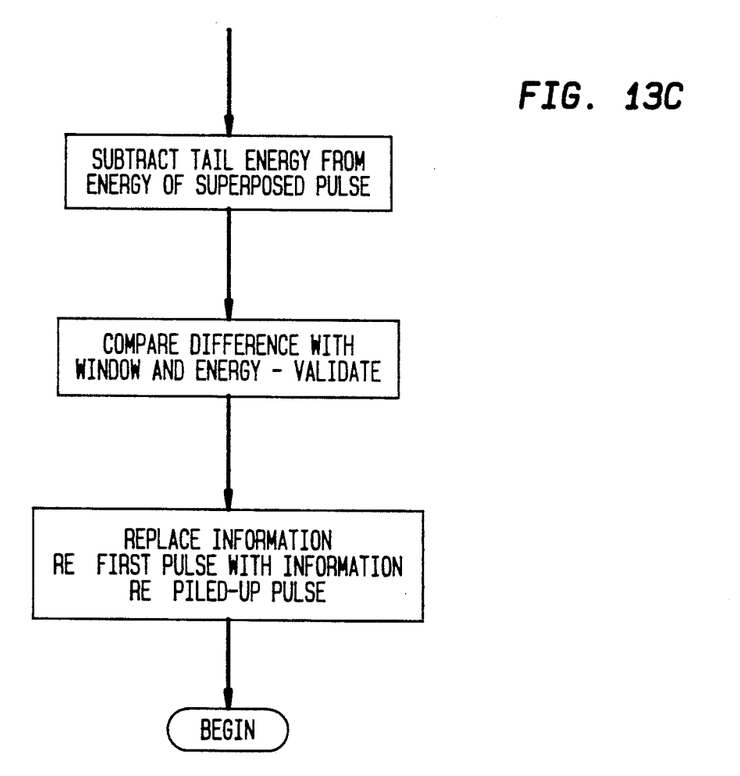

The preferred embodiment will now be described in connection with FIG. 13 (FIGS. 13A–C). Initially, the pulse-containing signal is monitored for pulses by checking for the existence of pulse amplitudes which exceed a predetermined threshold T. If the amplitude of the signal does not rise above T, it is assumed that the signal is noise.

When the amplitude of the signal rises above T (at time t1), the sample number and clock position at which this takes place is registered and the pulse-evaluation process begins. As the pulse is sampled, the amplitude of the current sample is compared with the amplitude of the previous sample and the sample amplitudes are summed. (The comparison step is not carried out with digitized information because the flash A/D converters are not fast enough to do this. In the preferred embodiment, the analog signal is monitored for a change in direction. However, should sufficiently fast flash A/D converters be developed, the comparison step could be carried out with digitized information.) As each sample exceeds the previous one, it is assumed that the pulse is continuing to increase. This continues until a current sample amplitude is equal to, or less than, the one before it. When this occurs (at time t2), it is assumed that the peak of a pulse has been reached. The sample number and clock position of the peak is registered, and the time interval between t1 and t2 is determined. If the peak occurs within 250 ns of the beginning of the pulse, the pulse is considered potentially valid; if not, the pulse is considered invalid and is dumped. In this latter event, sampling continues until the amplitude of the signal drops below threshold T. The sampling process then begins anew.

It will be understood that the 250 ns figure is only preferred and is not required. This can be changed if desired.

Where the pulse is considered potentially valid, sampling continues until the signal drops by more than some predetermined D. This step prevents low-level noise from being interpreted as a change in the signal. Sampling then continues until a) 21 samples have been taken or b) the amplitude of a current sample exceeds the amplitude of the immediately previous sample, whichever first occurs. (As discussed above, the b) step is advantageously carried out by monitoring the analog signal for changes in direction.)

If 21 samples have been taken before the amplitude of a current sample exceeds the amplitude of the immediately previous sample, this means that the pulse has commenced and effectively ended without any other pulses piling up upon it. In this event, the duration of the pulse is input to ROM1 and the output of ROM1 is used to multiply the total sum of the samples which have been accumulated (i.e. the time-integral of the pulse from the beginning to the time when sampling ceased). This product, which represents the total energy of the pulse under investigation, is then compared with the preestablished energy window. If the product falls within the window, the pulse is assumed to represent a valid event; if not, the pulse is assumed to represent an invalid event.

If, on the other hand, the amplitude of the sample increases from one sample to the next before 21 samples have been taken, this means that a pile-up has occurred because a second pulse has piled-up upon the first pulse. It is then necessary to determine whether the pile-up is unresolvable.

As discussed above, an unresolvable pile-up comes about when the second pulse follows the first pulse too closely. In the preferred embodiment, when the pile-up occurs sooner than 300 ns after the beginning of the first pulse, there will be insufficient information available to accurately energy-validate either of the piled-up pulses. Accordingly, when the pile-up occurs sooner than 300 ns, both pulses are dumped and the whole process begins anew once again after the signal amplitude has decreased below threshold T. (It will be understood that 300 ns is not necessary to practice the invention, and can be changed depending upon the results sought. As this figure is decreased, the reliability of energy-validation decreases; as this figure is increased, increasingly larger numbers of piled-up pulses will be dumped. 300 ns, is the presently preferred tradeoff between reliability and pile-up dumping.)

When the pile-up occurs later than 300 ns after the beginning of the first pulse, two functions must be carried out. In the first, the first pulse must be energy-validated; in the second, enough information about the first pulse must be stored to permit the second pulse to be energy-validated. The first function is carried out using ROM1; the duration of the first pulse is input to ROM1, the output from ROM1 is used to multiply the sum of all samples taken from the first pulse, and the resulting product is compared with the energy window and the first pulse determined to be valid or invalid, as the case may be. The duration of the first pulse, and the cumulative sum of all samples taken from the first pulse, are then stored, as is the time when the second pulse commences.

The second pulse is now sampled in the same way that the first pulse was sampled. The samples now are successively compared until they cease to increase from one sample to the next. When the first peak is detected, the duration of the second pulse is determined, and if the peak is within 250 ns of the beginning of the pulse, the second pulse is considered potentially valid. (If not, the pulse is dumped). The samples are then monitored, and the second pulse is considered to have ended after 21 samples or until the amplitude increases from one sample to the next.

When the second pulse has ended, ROM2 is used to output the tail of the first pulse and this quantity is then subtracted from the total sum of the samples taken during the occurrence of the second pulse. The duration of the second pulse is then input to ROM1, and the output of ROM1 is used to multiply the difference between the difference as computed above. The result, which is the extrapolated time integral of the second pulse alone, is then energy-validated and the pulse is accordingly treated as valid or invalid.

Persons skilled in the art of gamma cameras know that the problem of pulse pile-ups also affects the accuracy with which the X and Y signals are determined, and in exactly the same way. While the X and Y signals are not energy-validated or subjected to window comparison, it is nonetheless necessary to unpile pile-ups so as to accurately determine the X and Y coordinates at which an event occurs. It will be evident that the above-disclosed techniques are equally applicable to unpiling piled-up pulses for the purpose of determining the location of an event and are not restricted to determining the energy of the event. In the preferred embodiment, the X, Y and energy signals are processed in the same way in three parallel channels.

Those skilled in the art will understand that changes can be made in the preferred embodiments here described, and that these embodiments can be used for other purposes. Such changes and uses are within the scope of the invention, which is limited only by the claims which follow.

What is claimed is:

1. A method of processing a train of electrical pulses from a scintillation camera head so as to identify, separate from each other, and energy-validate, pulses which represent scintillation events that substantially overlap, or "pile up", upon each other, comprising the following steps:

monitoring the train of pulses and identifying those pulses which meet preestablished criteria defining potentially valid scintillation events;

upon identification of a current such pulse, determining whether said current pulse is piled up upon a previous, energy-validated pulse; and when such current pulse is determined to be not so piled up, simulating the energy of the scintillation event to which the current pulse corresponds and using such simulated energy for energy-validation; when such current pulse is determined to be so piled up, simulating, from the previous pulse, by extrapolation, the overlap energy released by the corresponding previous scintillation event between the beginning of the current pulse and the ending of the previous pulse, simulating the energy of the scintillation event to which the current pulse corresponds, subtracting, from the simulated energy of the current pulse, the simulated overlap energy of the previous pulse, and using such difference energy to simulate the energy of the current pulse for energy-validation.

2. The method of claim 1, wherein said monitoring and identifying step includes the steps of determining whether a pulse has reached its maximum value within 250 ns of its beginning and whether its subsequent decline at least equals a predetermined rate of decline.

3. The method of claim 1, wherein said determining step includes the steps of determining whether a current pulse is unresolvably piled-up upon a previous pulse and, if such unresolvable pile-up is determined to have occurred, dumping the current and previous pulses.

4. The method of claim 1, wherein all of said steps are performed in real time.

5. The method of claim 1, wherein said monitoring and identifying step includes the steps of sampling each pulse at a high frequency and summing the samples so obtained.

6. Apparatus for unpiling pulse pile-ups, comprising:
means for sampling, at a high frequency, a signal which contains pulses;
means, operatively connected with said sampling means, for determining when pulses have commenced and for determining a duration of a pulse between its commencement and a current time;
means, operatively connected with said sampling means, for progressively summing together samples of the signal in such a manner that the summed-together samples are all from a single pulse; and
means, operatively connected with said determining means and said summing means, for extrapolating, at said current time, from the total sum of the summed-together samples and the duration of a pulse under investigation, the time integral of said pulse from said current time until the end of said pulse.

7. A method of unpiling two piled-up pulses generated by phototubes in a scintillation camera head, wherein each pulse has a tail and a head and the tail of the first pulse overlaps the head of the second pulse, comprising the following steps:
ascertaining a time duration of the head of the first pulse;
time integrating said first pulse head;
extrapolating the total time-integral of said first pulse on the basis of said time duration and time-integration;
time-integrating the overlapping tail of the first pulse and the head of the second pulse;
extrapolating the time-integral of the tail of the first pulse on the basis of the time duration and time integration of the first pulse;
subtracting the extrapolated time-integral of said tail from the time-integral of said overlapping tail and head;
ascertaining a time duration of said overlapping tail and head;
extrapolating the total time-integral of said second pulse on the basis of said subtraction and said time duration of said overlapping tail and head.

8. A method of processing a train of electrical pulses from a scintillation camera head so as to identify and separate from each other pulses which are associated with scintillation events that substantially overlap, or "pile up", upon each other, comprising the step of extrapolating, at a current time, from a time-integral of a head portion of a pulse under investigation and a duration of said head portion between commencement of the pulse and a current time, the total time-integral of said pulse.

9. A method of processing a train of electrical pulses from a scintillation camera head so as to identify and separate from each other pulses which are associated with scintillation events that substantially overlap, or "pile up", upon each other, comprising the step of extrapolating, at a current time, from a time-integral of a head portion of a pulse under investigation and a duration of said head portion between commencement of the pulse and a current time, the shape of the tail of the pulse and the time-integral of said tail.

10. A method of processing a train of electrical pulses from a scintillation camera head so as to identify, separate from each other, and energy-validate, pulses which represent scintillation events that substantially overlap, or "pile up", upon each other, comprising the following steps:
sampling the train of pulses at a high frequency;
determining, at a current time, the duration of a pulse which is being processed, said duration commencing upon commencement of the pulse and ending at said current time;
summing only samples of said pulse which is being processed; and
determining, from a total sum of said samples and said duration, whether said pulse which is being processed is a valid pulse.

11. A scintillation camera system, comprising:
a scintillation crystal for detecting scintillation events during a patient study;
means for converting said scintillation events into electrical pulses;
means for sampling said pulses at a high frequency;
means, operatively connected with said sampling means, for determining when pulses have commenced and for determining a duration of a pulse between its commencement and a current time;
means, operatively connected with said sampling means, for progressively summing together samples of the signal in such a manner that the summed-together samples are all from the same pulse; and
means, operatively connected with said determining means and said summing means, for extrapolating, at said current time, from the total sum of the summed-together samples and the duration of a pulse under investigation, whether the pulse under investigation is valid.

* * * * *